(12) United States Patent
Rayer et al.

(10) Patent No.: US 11,774,837 B2
(45) Date of Patent: Oct. 3, 2023

(54) IMAGE DISPLAYING DEVICE AND METHOD FOR DISPLAYING AN IMAGE ON A SCREEN

(71) Applicant: OSRAM GmbH, Munich (DE)

(72) Inventors: Mathieu Rayer, Augsburg (DE); Boaz Sturlesi, Munich (DE)

(73) Assignee: OSRAM GMBH, Munich (DE)

( * ) Notice: Subject to any disclaimer, the term of this patent is extended or adjusted under 35 U.S.C. 154(b) by 129 days.

(21) Appl. No.: 17/421,271

(22) PCT Filed: Jan. 10, 2019

(86) PCT No.: PCT/EP2019/050486
§ 371 (c)(1),
(2) Date: Jul. 7, 2021

(87) PCT Pub. No.: WO2020/143915
PCT Pub. Date: Jul. 16, 2020

(65) Prior Publication Data
US 2022/0100070 A1  Mar. 31, 2022

(51) Int. Cl.
*G03B 21/20* (2006.01)
*G02B 27/42* (2006.01)

(52) U.S. Cl.
CPC ..... *G03B 21/2033* (2013.01); *G02B 27/4205* (2013.01)

(58) Field of Classification Search
CPC . G03B 21/2033; G03B 21/20; G02B 27/4205
See application file for complete search history.

(56) References Cited

U.S. PATENT DOCUMENTS

| | | | | |
|---|---|---|---|---|
| 2002/0074522 A1* | 6/2002 | Zakar | ..................... | H01L 27/16 257/E27.008 |
| 2006/0018025 A1* | 1/2006 | Sharon | ................. | H04N 9/3129 348/E9.026 |
| 2006/0082887 A1* | 4/2006 | Po-Hung | ............ | G02B 19/0066 359/626 |

(Continued)

FOREIGN PATENT DOCUMENTS

WO   2018/050337 A1   3/2018

OTHER PUBLICATIONS

International Search Report issued for corresponding International Patent Application No. PCT/EP2019/050486 dated Oct. 2, 2019.

(Continued)

*Primary Examiner* — Magda Cruz
(74) *Attorney, Agent, or Firm* — HAUPTMAN HAM, LLP

(57) ABSTRACT

An image displaying device includes a micro-LED-array having several LEDs, a controller electrically connected to the micro-LED-array for driving the LEDs such that they emit light, and a lens-array having several lenses. Each lens is assigned to one of the LEDs. Each lens is arranged in the light path of the light emitted by the corresponding LED such that the light emitted by the LEDs passes through the corresponding lens and is projected onto a screen. The lens-array is configured such that, when seen from the screen, a virtual image of the micro-LED-array is formed behind the micro-LED-array. The lens-array is a meta-lens-array and the lenses are meta-lenses.

12 Claims, 4 Drawing Sheets

(56) References Cited

U.S. PATENT DOCUMENTS

| | | | |
|---|---|---|---|
| 2018/0202624 A1* | 7/2018 | De Lamberterie | ........................... |
| | | | G02B 19/0066 |
| 2018/0259155 A1* | 9/2018 | Di Trapani | ............. F21V 5/004 |
| 2019/0033683 A1* | 1/2019 | Ahmed | ................... C23C 16/24 |
| 2019/0203907 A1* | 7/2019 | Lefaudeux | ............ F21S 41/255 |
| 2019/0235313 A1* | 8/2019 | Imai | .................. G02F 1/133504 |

OTHER PUBLICATIONS

Written Opinion issued for corresponding International Patent Application No. PCT/EP2019/050486 dated Oct. 2, 2019.

* cited by examiner

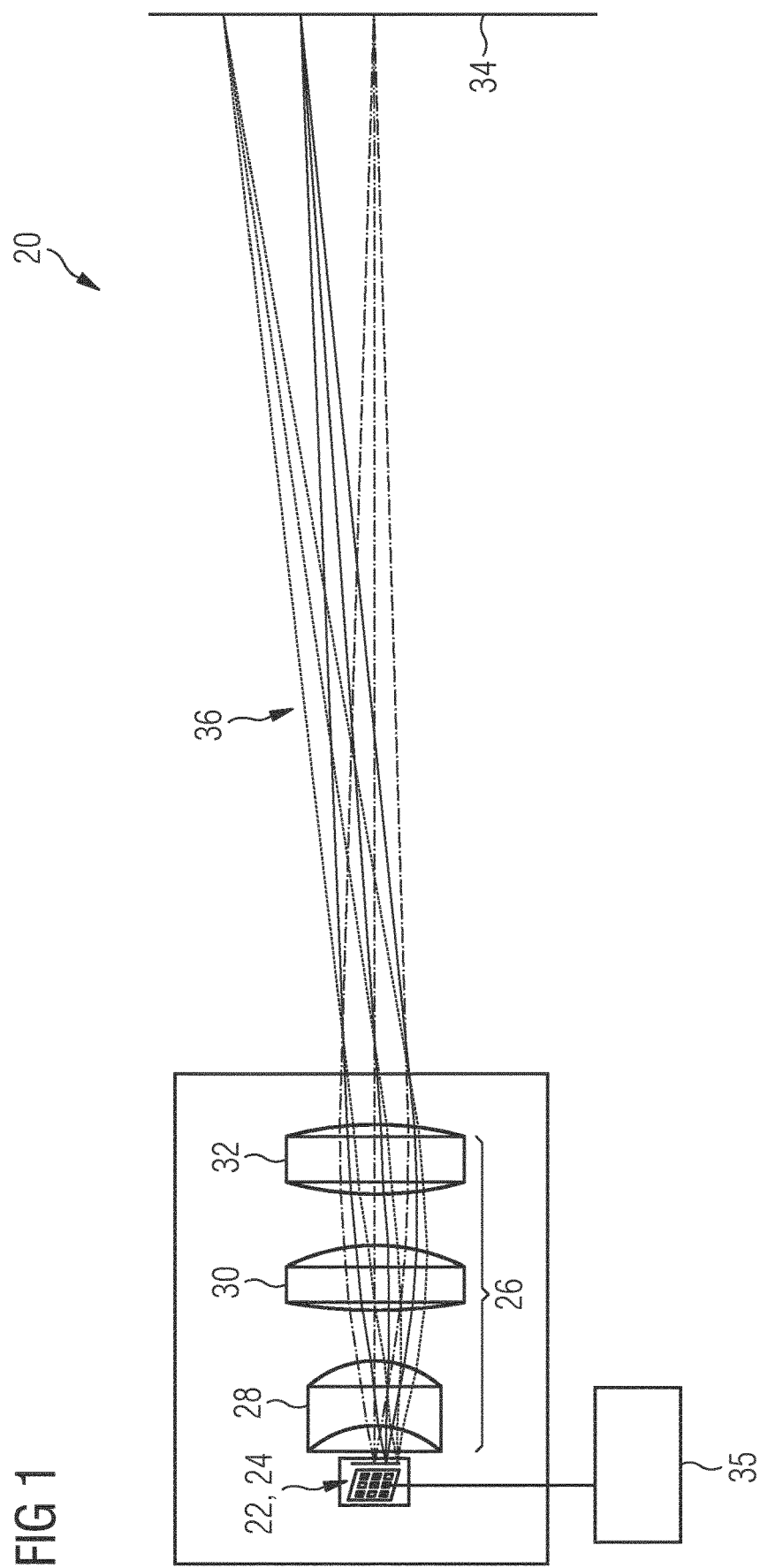

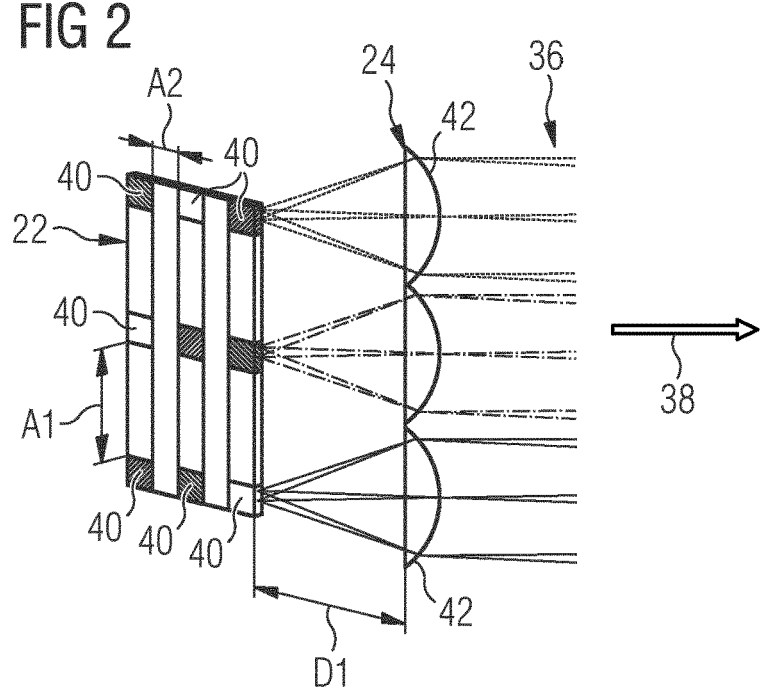
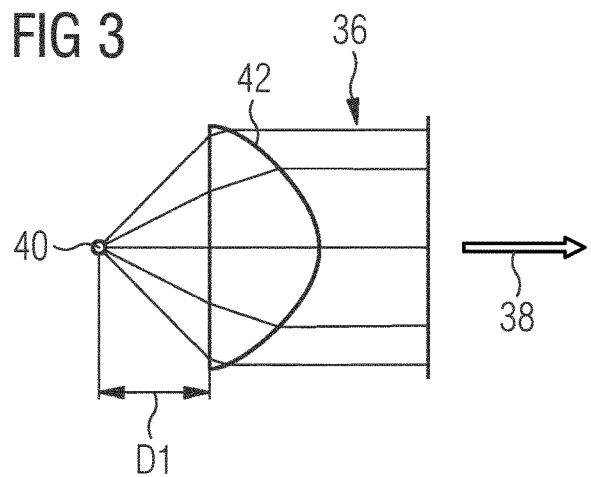
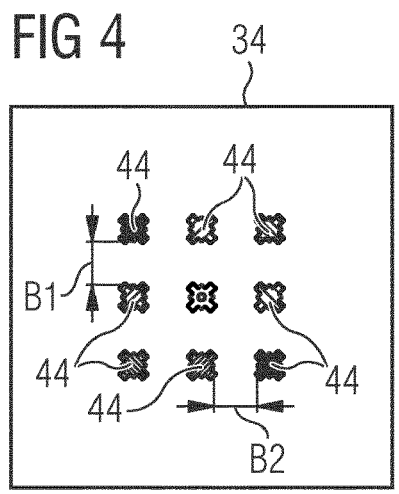

IMAGE DISPLAYING DEVICE AND METHOD FOR DISPLAYING AN IMAGE ON A SCREEN

CROSS REFERENCE TO RELATED APPLICATION

This application is a National Stage of International Application No. PCT/EP2019/050486, filed on Jan. 10, 2019, which designates the United States and was published in Europe. The aforementioned application is hereby incorporated by reference in its entirety.

The invention relates to an image-displaying device and a method for displaying an image on a screen An image-displaying device may for example be a projector, projecting an image on a screen outside of the projector, or a display device, projecting an image on a screen, which is a part of the display, wherein the image can be seen from outside of the display when looking on the screen.

Micro light emitting diode arrays, in the following micro-LED-arrays, attract considerable attention in recent years because of their micro-scale size and energy characteristics, micro-LED-arrays can offer better current distribution, higher brightness, more uniform light output and faster response time than conventional LED arrays. Due to this features it became attractive for the realization of display devices and projectors.

However, one major disadvantage of the usage of micro-LED-arrays for displays is their relatively low fill factor compared to conventional display technologies, such as LCD. Wide isolation gaps between adjacent LEDs of the micro-LED-arrays limit the pixel density and the quality of the formed image. Imaging a spars micro-LED source to a screen will create an image with a large separation gap between adjacent pixels. This leads to "dead lines" in the formed image and a poor quality Image. However, if the gaps between adjacent LEDs would be small enough such that a sufficient fill factor could be achieved, limitations in terms of thermal management and electrical drive from CMOS backplane electronics are not sufficiently fulfilled. These facts prevent the realization of image-displaying devices, having a micro-LED-array as a light source, with satisfying performance.

Hitherto, one has to suffer from the inevitable trade-off between a high pixel fill factor and a sufficient isolation gap between adjacent light emitting units, in order to fulfill the limitations in terms of thermal management and electrical drive from CMOS backplane electronics.

It is an object of the present invention to provide an image-displaying device having a micro-LED-array as a light source, while enabling displaying an image having a high fill factor in an image plane and while maintaining a sufficient isolation space between adjacent LEDs of the micro-LED-array.

It is an object of the present invention to provide a method for displaying an image on a screen using a micro-LED-array as a light source, while enabling displaying the image having a high fill factor in an image plane and while maintaining a sufficient isolation space between adjacent LEDs of the micro-LED-array.

In various embodiments the object is achieved by an image-displaying device, comprising a micro-LED-array having several LEDs, a controller electrically connected to the micro-LED-array for driving the LEDs such that they emit light, and a lens-array having several lenses; wherein each lens is assigned to one of the LEDs; each lens is arranged in the light path of the light emitted by the corresponding LED such that the light emitted by the LEDs passes through the corresponding lens and is projected onto a screen; and the lens-array is configured such that, when seen from the screen, a virtual image of the LEDs is formed behind the micro-LED-array.

The image-displaying device allows the projection of the micro-LED-array with a very high pixel fill factor in the image plane, while maintaining sufficient isolation gaps between the LEDs of the micro-LED-array. This enables displaying a high quality image, while having benefits in terms of thermal management and electrical drive from CMOS backplane electronics. This allows the realization of a reduction of the size of the image-displaying device, while providing a high image quality. Moreover, the image-displaying device has a high efficiency and low power consumption and provides a bright image.

The virtual image is an image formed when the outgoing rays from a point on an object always diverge. The image appears to be located at the point of apparent divergence. The virtual image is located by tracing the real rays, which emerge from the lens-array, backward to a perceived point of origin. The virtual image is created by the lens-array, which may form or be a part of a primary optic that is designed to achieve the above task. Further, a secondary optic may be provided to image the object plane to the screen at the corresponding distance and with a corresponding magnification.

In various embodiments, the virtual image is formed such that third and fourth gaps between adjacent virtual images of the LEDs are smaller than corresponding first and second gaps between the corresponding LEDs. This contributes to that a gap between the pixels in the image plane is smaller than without the lens-array forming a virtual image of the LEDs behind the micro-LED-array. This contributes to a high fill factor in the image plane.

In various embodiments, the virtual image is formed such that there are no third and fourth gaps between the adjacent virtual images of the LEDs. In other words, the virtual images of the pixels have the size of a full unit cell, corresponding to an LED and the gaps between the LED and the neighboring LEDs. This contributes to that there is no gap between the pixels in the image plane. This contributes to a very high fill factor in the image plane. In particular, this enables a fill factor of 100%.

In various embodiments, the lens-array is a meta-lens-array and the lenses are meta-lenses, i.e. flat diffractive lenses. This contributes to that the image-displaying device is very efficient and that the lens-array may be designed very flat. By using meta-lenses instead of conventional refractive lenses an image-displaying device may be created having a high numerical aperture. This enables the collection of almost all the light emitted by the LEDs, thus a very bright image, and a low power consumption. For example, according to a rough calculation, the numerical aperture of a conventional refractive lens is limited to 0.7 due to the limitation of the curvature of the surface. On the other hand, the use of meta-lenses enables a numerical aperture (NA) as high as 0.95. Assuming a Lambertion light source, this increases the collection efficiency from 50% to 90.5%.

In various embodiments, the meta-lenses are flat diffractive lenses.

In various embodiments, each lens of the meta-lens-array comprises a substrate and multiple pillars formed on the substrate. The substrate may comprise or is made of glass, for example of silicon oxide, and/or wherein the pillars may comprise or are made of titanium dioxide.

In various embodiments, a maximal side length or diameter of a light emitting surface of each LED of the micro-LED-array is in a range of 1 µm to 50 µm, for example in a range of 2 µm to 10 µm, for example approximately or exactly 4 µm.

In various embodiments, a maximal gap between two neighboring LEDs is in the range of 2 µm to 100 µm, for example in the range of 4 micrometer to 20 µm, for example approximately or exactly 15 µm.

In various embodiments, the micro-LED-array comprises between 10×10 and 10000×10000 LEDs, for example between 100×100 and 1000×1000 LEDs, for example between 200×200 and 500×500 LEDs. However, the array of the micro-LEDs does not have to be quadratic. For example, instead of 10×10 LEDs there may be provided 2×5 LEDs and/or instead of 100×100 LEDs there may be provided 10×1000 or 20×500 LEDs etc.

In various embodiments, a second distance between the micro-LED-array and the lens-array is in the range of 1 µm to 100 µm, for example in the range of 3 µm to 50 µm, for example in the range of 5 µm to 10 µm. This contributes to that that the image-displaying device may be embodied very thin.

In various embodiments, a diameter or maximal side length of each lens corresponds to a maximal side length of the corresponding LED plus a gap between the corresponding LED and a neighboring LED. This contributes to that that each lens collects as much light as possible from its corresponding LED.

In various embodiments, the lens-array is a primary optic of the image-displaying device, wherein the image-displaying device comprises a secondary optic being arranged between the primary optic and the screen for projecting the light exiting the primary optic on the screen.

In various embodiments, the image-displaying device is configured as a projector, wherein the screen is arranged outside the projector. For example, the screen is arranged a few meters away from the projector.

In various embodiments, the image-displaying device is configured as a display device comprising the screen. For example, the image-displaying device is a computer monitor, a television, a laptop, a handheld device, a mobile phone, or a tablet PC.

In various embodiments the object is achieved by a method for displaying an image on the screen, comprising: generating light by a micro-LED-array having several LEDs under the control of a controller electrically connected to the micro-LED-array; forming the light emitted by the LEDs by a lens-array having several lenses, with each lens being assigned to one of the LEDs and being arranged in the light path of the light emitted by the corresponding LED; and projecting the light formed by the lens-array onto a screen, wherein the light is formed by the lens-array such that, when seen from the screen, a virtual image of the LEDs is formed behind the micro-LED-array.

The advantages embodiments and advantages of the image-displaying device explained above may be transferred to the method for displaying an image on the screen without prejudice.

Exemplary embodiments of the invention are shown in the figures and explained in the following.

FIG. 1 shows a conventional image-displaying device;

FIG. 2 shows a micro-LED-array and a primary optic of the conventional image-displaying device according to FIG. 1;

FIG. 3 shows a refractive lens of the primary optic and a source emitter in the focal point according to FIG. 2;

FIG. 4 shows an image of a micro-LED-Array generated by the conventional image-displaying device according to FIG. 1;

Figure 5:
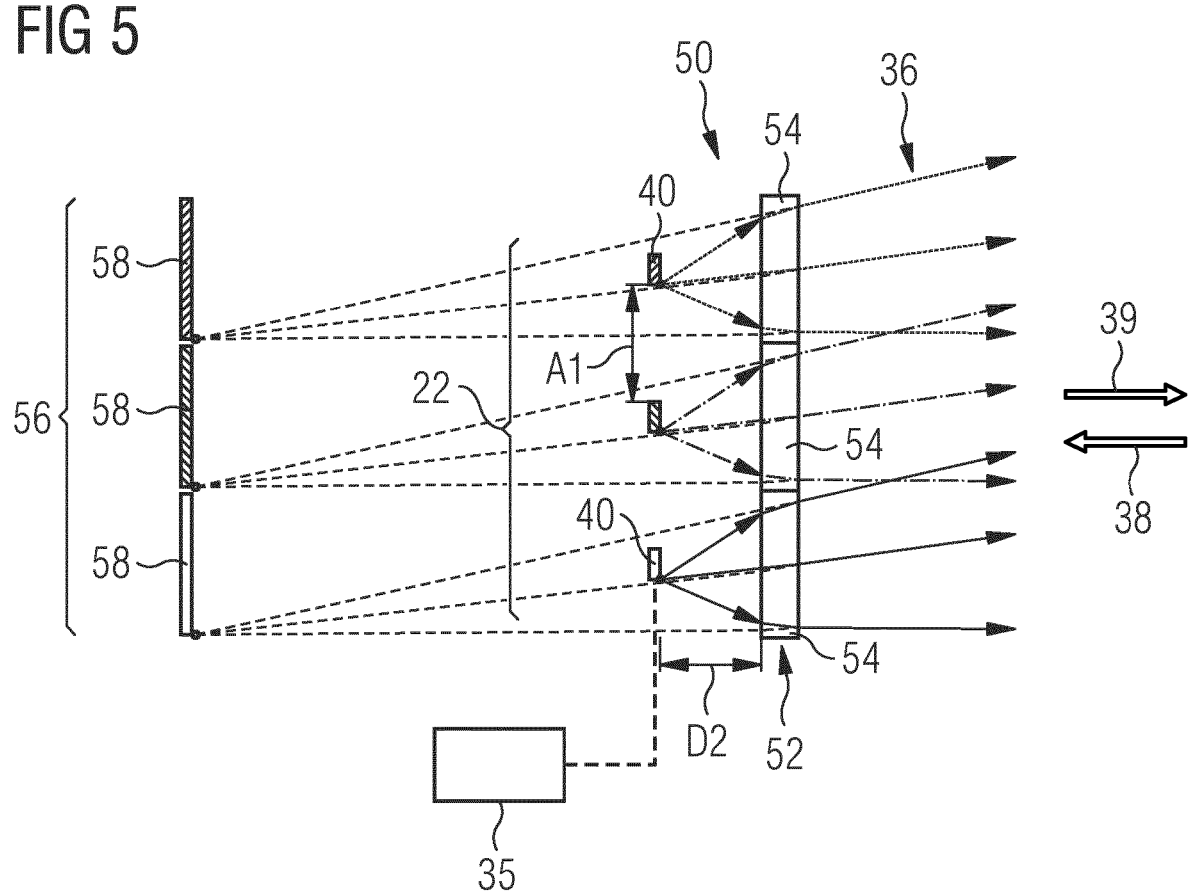
Figure 6:
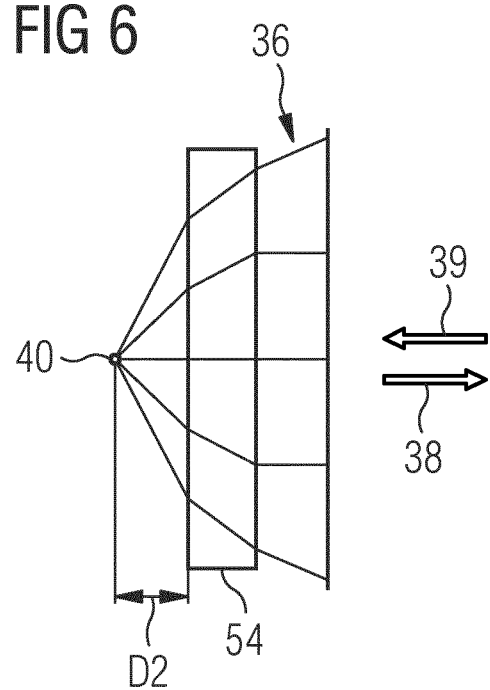
Figure 7:
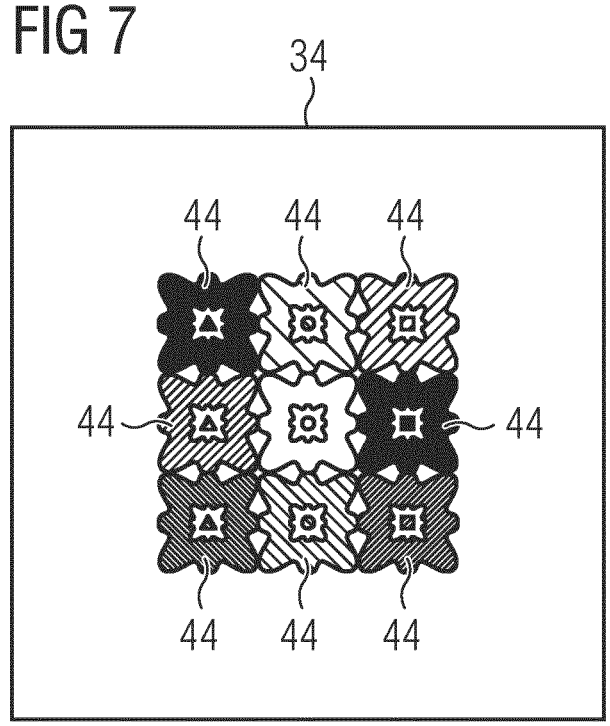

FIG. 5 an exemplary embodiment of an image-displaying device;

FIG. 6 shows a flat diffractive lens, i.e. a meta-lens, of a primary optic and a source emitter at the focal point of the image-displaying device according to FIG. 5;

FIG. 7 shows an image of a micro-LED-array generated by the image-displaying device according to FIG. 5.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

FIG. 1 shows a conventional image-displaying device 20. The conventional image-displaying device 20 may for example be a projector. The conventional image-displaying device 20 comprises a micro-LED-array 22, a primary optic 24, a secondary optic 26 and a controller 35. The secondary optic 26 comprises a first lens 28, a second lens 30, and a third lens 32. An image generated by the image-displaying device 20 may be projected onto the screen 34.

The micro-LED-array 22 is arranged for generating light traveling along different lights path 36 and constituting an image in an image plane depending on an image data signal received from the controller 35. The primary optic 24 is arranged for collimating the light generated by the micro-LED-array 22. The secondary optic 26 is arranged for imaging the object plane, in which the micro-LED-array 22 is arranged, on the screen 34. The screen 34 is arranged in the image plane. The size of the image on the screen 34 in the image plane depends on the distance of the screen 34, in particular the secondary optic 26, to the conventional image-displaying device 20.

FIG. 2 shows the micro-LED-array 22 and the primary optic 24 of the conventional image-displaying device 20 according to FIG. 1. The micro-LED-array 22 comprises several LEDs 40 arranged in form of a 2-dimensional matrix. First gaps A1 are formed in between neighboring LEDs 14 in vertical direction. Second gaps A2 are formed between neighboring LEDs 14 in horizontal direction. The micro-LED-array 22 is arranged at a first distance D1 away from the primary optic 24.

The primary optic 24 comprises several fourth lenses 42. The primary optic 24 may be a micro-lens-array. Each lens 42 of the primary optic 24 is assigned to one corresponding LED 40 of the micro-LED-array 22. As such, each lens 24 collects and collimates the light emitted by the corresponding LED 40. The light collimated by the lenses 24 is further emitted in a first direction 38 towards the secondary optic 26 and further to the screen 34.

FIG. 3 shows a refractive lens 42 of the primary optic 24 and a source emitter in the focal point, for example an LED 40 of the micro-LED-array 22, according to FIG. 2. A numerical aperture of the arrangement as shown in FIG. 3 is limited because of a limitation of the refraction angle of the curved surface of the lens 42 due to Snell's law. In particular, the numerical aperture is limited to 0.7.

Further, there is a predetermined minimal distance between the LED 40 and the lens 42, limiting the possibility of providing a very thin image-displaying device. Therefore, the first distance D1 has a given lower limit.

In addition, because of this predetermined minimal distance, the amount of light collected by each lens is limited. For example, in the embodiment shown in FIG. 3, the maximal angle between two light paths of the light collected by the lens 42 is about 45°, because of the predetermined minimal distance. Therefore, assuming the LED 40 being a Lambert'ion light source, the efficiency of the collection of the light emitted by the LED 40 by the lens 42 is only approximately 50%.

FIG. 4 shows an image of the micro-LED-Array 22 generated by the conventional image-displaying device 20 according to FIG. 1. In particular, FIG. 4 shows the simulation of the image, wherein only the images of the edge portions of the corresponding LEDs 40 are simulated. The image comprises several LED images 44, which correspond to the corresponding LED's 40 projected onto the screen 34 by the primary optic 24 and the secondary optic 26. There are several third gaps B1 between neighboring LED images 44 in a vertical direction of the image and several fourth gaps B2 between neighboring LED images 44 in a horizontal direction of the image.

The third gaps B1 are due to the first gaps A1 and the fourth gaps B2 are due to the second gaps A2. Due to the third gaps B1 and the fourth gaps B2 the fill factor of the image shown in FIG. 4 is very low. Further, the third gaps B1 and the fourth gaps B2 result in several dead-lines in the image leading to a low image quality. The sizes of the third gaps B1 and the fourth gaps B2 have a lower limit, because of the limited numerical aperture, as explained in context with FIG. 3. Thus, with the conventional image-displaying device 20 using the micro-LED-array 22 as a light source, the fill factor has a given upper limit.

Further, because of the limited numerical aperture, the efficiency of the conventional image-displaying device and/or the brightness of the image are low and/or the power consumption of the conventional image-displaying device is high.

FIG. 5 shows an exemplary embodiment of an image-displaying device 50. The image-displaying device 50 comprises the micro-LED-array 22 including the LEDs 40, which are separated from each other by the first gaps A1 and the second gaps A2, and a meta-lens-array 52 comprising several meta-lenses 54. The meta-lens-array 54 is the primary optic 24 of the image-displaying device 50. The micro-lens-array 22 is arranged at a second distance D2 away from the meta-lens-array 52. Not shown in FIG. 5 is the secondary optic 26 of the image-displaying device 50, which is arranged in the first direction 38, when seen from the meta-lens-array 52, as explained with respect to the conventional image-displaying device 20 shown in FIG. 1. Also not shown in the FIG. 5 is the screen 34. The image-displaying device is 50 may for example be a projector not including the screen 34 or a display including the screen 34.

The meta-lenses 54 for example are diffractive lenses or, in particular, flat diffractive lenses. The meta-lens-array 52 is configured such that, when seen from the second direction 39, which is opposite to the first direction 38, a virtual image 56 of the micro-LED-array 22 is formed behind the micro-LED-array 22. The virtual image 56 of the micro-LED-array 22 comprises several virtual images 58 of the single LEDs 40. The virtual image 56 is formed such that the distances between neighboring virtual images 58 of the LEDs of 40 are smaller than the first gaps A1 and the second gaps A2. Preferably, the virtual image of 56 is formed such that there are no gaps between the virtual images 58 of the LEDs 40. In this case, the size of one virtual image 58 of one of the LEDs 40 corresponds to the size of the corresponding LED and one of the first gaps A1 and one of the second gaps A2. In other words, the size of one virtual image 58 corresponds to one unit cell of the micro-LED-array 22.

The technical effect of forming the virtual image 56 behind the micro-LED-array 22 by the meta-lens-array 50 is that the third gaps B1 and the fourth gaps B2 between neighboring pixels in the image plane on the screen 34 are reduced with reducing the distances between the virtual images 58 of the LEDs 40. So, if there are no gaps between the virtual images 58 of the LEDs of 40, as it is in one of preferred configuration, there are also no gaps between the corresponding pixels in the image plane on the screen 34, i.e. the sizes of the third gaps B1 and fourth gaps B2 are zero. This enables to achieve a very high fill factor in the image plane, in particular up to 100%.

In addition, the numerical aperture of each meta-lens 54 is not as strongly limited as the numerical aperture of the conventional micro-lens shown in FIG. 3. Therefore, using the meta-lens-array 52 as the primary optic 24 of the image-displaying device 50 enables to arrange the micro-LED-array 22 very close to the primary optic 24, i.e. the meta-lens-array 52. As such, the second distance D2 is smaller than the first distance D1. This contributes to that that the image-displaying device 50 may be formed very thin.

In general, a virtual image is an image formed when the outgoing rays from a point on an object always diverge. The image appears to be located at the point of apparent divergence. However, the virtual image seems to be located at a position achieved by tracing the real rays that emerge from the micro lens backward to a perceived point of origin as appears in the scheme.

FIG. 6 shows a flat diffractive lens, i.e. a meta-lens 54, in particular one of the meta-lenses 54 of the primary optic 24 of the image-displaying device 50 according to FIG. 5, and a source emitter, for example one of the LEDs 40 at the focal point of the image-displaying device according to FIG. 5. The numerical aperture of the arrangement as shown in FIG. 6 is not limited by the refraction angle of a curved surface due to Snell's law, because the meta-lenses 54 do not comprise any corresponding curved surface. In particular, the numerical aperture of each meta-lens 54 may be increased up to 0.95. Therefore, the second distance D2 can be made smaller than the first distance D1.

In addition, because the second distance D2 is smaller than the first distance D1, the amount of light collected by each meta-lens 54 is larger than the amount of light collected by each conventional lens 42. For example, in the embodiment shown in FIG. 6, the maximal angle between two light paths of the light collected by the meta-lens 54 is about 72°. Therefore, assuming the LED 40 being a Lambert'ion light source, the efficiency of the collection of the light emitted by the LED 40 by the meta-lens 54 is approximately 90.5%. So, the meta-lens-array 52 contributes to that that the image-displaying device 50 has a very high efficiency.

FIG. 7 shows an image generated the by the image-displaying device according to FIG. 5. In particular, FIG. 7 shows the simulation of the image, wherein only the images of the edge portions of the corresponding LEDs 40 are simulated. FIG. 7 shows the case, in which there are no gaps between neighboring virtual images 58 of the LEDs in the virtual image 56 of the micro-LED-array 22. The image comprises several LED images 44, which correspond to the corresponding LEDs 40 projected onto the screen 34 by the primary optic 24 and the secondary optic 26. There are no third gaps B1 between neighboring LED images 44 in a vertical direction of the image and no fourth gaps B2 between neighboring LED images 44 in a horizontal direction of the image.

There are no gaps in the image in the image plane, because there are no gaps between neighboring virtual images 58 of the LEDs in the virtual image 56 of the micro-LED-array 22. Thus, there are no dead-lines in the image leading to a high image quality. So, with the image-displaying device 50 using the micro-LED-array 22 as a light source and the meta-lens-array 52 is a primary optic 24, the fill factor of the image shown in FIG. 7 is very high, in particular approximately 100%.

Further, because of the large numerical aperture, the efficiency of the image-displaying device 50 and/or the brightness of the image are high and/or the power consumption of the conventional image-displaying device 50 is low.

In an alternative embodiment, the meta-lens-array 52 may be configured such that there are gaps between the virtual images 58 of the LEDs 40 in the virtual image 56 of the micro-LED-array 22, wherein these gaps always should be smaller than the first gaps A1 and the second gaps A2 between the LEDs 40 of the micro-LED-array 22. In this case, there are gaps between the LED images 44 in the image plane. However, these gaps are smaller than the third gaps B1 and the fourth gaps B2. Thus, also according to this alternative embodiment, the fill factor and the quality of the image of the image-displaying device 50 are better than those of the conventional image-displaying device 20.

The invention is not limited to the embodiments explained above. In particular, the image-displaying device 50 may comprise the screen 34 or not. Further, the meta-lens-array 52 may be configured such that there are no gaps in the virtual image 56 and/or that the virtual image 56 has a fill factor of 100%, or that there are gaps in the virtual image 56, which are smaller than the first gaps A1 and/or the second gaps A2. The micro-LED-array 22 may comprise more or less LEDs 40 than shown in the figures. The meta-lens-array 52 may comprise more or less meta-lenses 54 than shown in the figures.

LIST OF REFERENCE NUMERALS 20 conventional image-displaying device
22 micro-LED-array
24 primary optic
26 secondary optic
28 first lens
30 second lens
32 third lens
34 screen
35 controller
36 light paths
38 first direction
39 second direction
40 LED
42 fourth lens
44 LED image
50 image-displaying device
52 meta-lens-array
54 meta-lens
56 virtual image of micro-LED-array
58 virtual image of LEDs
D1 first distance
D2 second distance
A1 first gap
A2 second gap
B1 third gap
B2 fourth gap

The invention claimed is:

1. An image displaying device, comprising a micro-LED-array having several LEDs, a controller electrically connected to the micro-LED-array for driving the LEDs such that they emit light, and a lens-array having several lenses, wherein
    each lens is assigned to one of the LEDs,
    each lens is arranged in the light path of the light emitted by the corresponding LED such that the light emitted by the LEDs passes through the corresponding lens and is projected onto a screen, and
    the lens-array is configured such that, when seen from the screen, a virtual image of the micro-LED-array is formed behind the micro-LED-array,
    the lens-array is a meta-lens-array and wherein the lenses are meta-lenses, and
    the LEDs are separated by gaps and the virtual image of the micro-LED-array is formed such that there are no gaps between adjacent virtual images of the LEDs.

2. The image displaying device according to claim 1, wherein the meta-lenses are flat diffractive lenses.

3. The image displaying device according to claim 1, wherein a maximal side length or diameter of a light emitting surface of each LED of the micro-LED-array is in a range of 1 µm to 50 µm.

4. The image displaying device according to claim 1, wherein a maximal gap between two neighboring LEDs is in the range of 2 µm to 100 µm.

5. The image displaying device according to claim 1, wherein the micro-LED-array comprises between 10×10 and 10000×10000 LEDs.

6. The image displaying device according to claim 1, wherein a distance between the micro-LED-array and the lens-array is in the range of 1 µm to 100 µm.

7. The image displaying device according to claim 1, wherein a diameter or maximal side length of each lens corresponds to a maximal side length of the corresponding LED plus one first gap in a vertical direction and plus one second gap in a horizontal direction between the corresponding LED and neighboring LEDs.

8. The image displaying device according to claim 1, wherein the lens-array is a primary optic of the image-displaying device and wherein the image-displaying device comprises a secondary optic being arranged between the primary optic and the screen for projecting the light exiting the primary optic on the screen.

9. The image displaying device according to claim 1, being configured as a projector, wherein the screen is arranged outside the projector.

10. The image displaying device according to claim 1, being configured as a display device comprising the screen.

11. A method for displaying an image on a screen, the method comprising:

generating light by a micro-LED-array having several LEDs under the control of a controller electrically connected to the micro-LED-array, forming light emitted by the LEDs by a lens-array having several lenses, with each lens being assigned to one of the LEDs and being arranged in a light path of the light emitted by the corresponding LED, and projecting the light formed by the lens-array onto the screen, wherein the light is formed by the lens-array such that, when seen from the screen, a virtual image of the LEDs is formed behind the micro-LED-array, and wherein the LEDs are separated by gaps and the virtual image of the micro-LED-array is formed such that there are no gaps between adjacent virtual images of the LEDs.

12. An image displaying device, comprising a micro-LED-array having several LEDs, a controller electrically connected to the micro-LED-array for driving the LEDs such that they emit light, and a lens-array having several lenses, wherein each lens is assigned to one of the LEDs, each lens is arranged in the light path of the light emitted by the corresponding LED such that the light emitted by the LEDs passes through the corresponding lens and is projected onto a screen, the lens-array is configured such that, when seen from the screen, a virtual image of the micro-LED-array is formed behind the micro-LED-array, the lens-array is a meta-lens-array, the lenses are meta-lenses, the meta-lenses are flat diffractive lenses, and the meta-lenses are rectangular in cross-section, and the LEDs are separated by gaps and the virtual image of the micro-LED-array is formed having a 100% fill factor.

* * * * *